(12) United States Patent
Zeng

(10) Patent No.: US 12,710,683 B2
(45) Date of Patent: Aug. 18, 2026

(54) EXTERNAL FLASH AND FLASH SYSTEM

(71) Applicant: GODOX PHOTO EQUIPMENT CO., LTD., Shenzhen (CN)

(72) Inventor: Weijun Zeng, Shenzhen (CN)

(73) Assignee: GODOX PHOTO EQUIPMENT CO., LTD., Shenzhen (CN)

( * ) Notice: Subject to any disclaimer, the term of this patent is extended or adjusted under 35 U.S.C. 154(b) by 0 days.

(21) Appl. No.: 19/264,432

(22) Filed: Jul. 9, 2025

(65) Prior Publication Data

US 2025/0341760 A1 Nov. 6, 2025

Related U.S. Application Data

(63) Continuation of application No. PCT/CN2024/127771, filed on Oct. 28, 2024.

(30) Foreign Application Priority Data

Nov. 14, 2023 (CN) ......................... 202323086279.3

(51) Int. Cl.
*G03B 15/03* (2021.01)
*G03B 15/05* (2021.01)

(52) U.S. Cl.
CPC ............ *G03B 15/03* (2013.01); *G03B 15/05* (2013.01)

(58) Field of Classification Search
CPC ................................ G03B 15/03; G03B 15/05
USPC ........................................................ 362/8, 9
See application file for complete search history.

(56) References Cited

U.S. PATENT DOCUMENTS

| | | | | |
|---|---|---|---|---|
| 3,997,775 A | 12/1976 | Stoneham | | |
| 4,395,748 A | 7/1983 | Killian, Jr. | | |
| 5,345,284 A | 9/1994 | Tsuruta | | |
| 2002/0039490 A1* | 4/2002 | Hagiuda | ................ | G03B 15/03 396/155 |
| 2015/0153631 A1* | 6/2015 | Chen | ..................... | G03B 15/05 362/8 |

FOREIGN PATENT DOCUMENTS

| | | |
|---|---|---|
| CN | 103032772 | 4/2013 |
| CN | 204009319 | 12/2014 |
| CN | 204302638 | 4/2015 |
| CN | 205787519 | 12/2016 |
| CN | 221261477 | 7/2024 |
| JP | H1073867 | 3/1998 |
| JP | 2006171192 | 6/2006 |

OTHER PUBLICATIONS

WIPO, International Search Report for PCT/CN2024/127771, Jan. 23, 2025.
EPO, Extended European Search Report for EP Application No. 24890475.7, Jul. 7, 2026.

* cited by examiner

*Primary Examiner* — Keith G. Delahoussaye
(74) *Attorney, Agent, or Firm* — Hodgson Russ LLP

(57) ABSTRACT

An external flash lamp and a flash lamp system. The flash lamp system comprises an external flash lamp and a set-top flash lamp. After the external flash lamp is detachably fixed to the set-top flash lamp, the external flash lamp can be electrically connected to the set-top flash lamp, so as to transmit a control signal and an operating current. The illumination range of the external flash lamp can supplement the illumination range of the set-top flash lamp, thereby solving the problem of low brightness of some areas.

20 Claims, 6 Drawing Sheets

EXTERNAL FLASH AND FLASH SYSTEM

CROSS-REFERENCE TO RELATED APPLICATIONS

The present application is a continuation of International Application No. PCT/CN2024/127771, filed on Oct. 28, 2024, which claims priority to Chinese Patent Application No. 2023230862793, filed on Nov. 14, 2023, the entire disclosures of which are hereby incorporated herein by reference.

TECHNICAL FIELD

The present application relates to the technical field of photography and video equipment, and in particular to an external flash and a flash system.

BACKGROUND

With the continuous improvement of people's living standards, photography has become increasingly popular in daily life, so people's requirements for photography effects are also getting higher and higher. The camera-mounted flash is an external photography auxiliary lighting device installed on the camera through the hot shoe at the top of the camera, and is deeply favored by users because of its excellent portability.

The tilt angle of the lamp head of the current camera-mounted flash can be adjusted. Sometimes, in indoor photography, in order to achieve a specific lighting effect, the user will turn the lamp head of the camera-mounted flash upward, so that the light emitted by the flash is reflected by the ceiling and then irradiated onto the subject.

However, since the light-emitting surface of the lamp head of the camera-mounted flash faces upward, the light below the light-emitting surface will be blocked by the lamp head, which will result in low brightness in part of the area in front of the camera-mounted flash, affecting the photography imaging effect and the user experience.

SUMMARY

There is provided an external flash and a flash system according to embodiments of the present application. The technical solution is as below:

According to a first aspect of embodiments of the present application, there is provided an external flash, the external flash is detachably mounted on a camera-mounted flash, and the external flash is electrically connected to the camera-mounted flash;

- a rear side of the external flash is mountable on a front side of a body of the camera-mounted flash; and
- a light-transmitting window for light emission is provided on an outer side of the external flash, and light emitted by a light source in the external flash is emitted toward the front side of the external flash through the light-transmitting window.

According to a second aspect of embodiments of the present application, there is provided a flash system, including the external flash as mentioned above and a camera-mounted flash, the external flash is detachably mounted on the camera-mounted flash;

- the camera-mounted flash includes a body and a flash head rotatably provided at a top of the body, a rear side of the external flash is mounted on a front side of the body; an end surface of the flash head away from the body is a light-emitting surface of the camera-mounted flash, and light emitted by the light source in the external flash is emitted toward the front side of the external flash through the light-transmitting window.

DETAILED DESCRIPTION OF THE EMBODIMENTS

Figure 1:
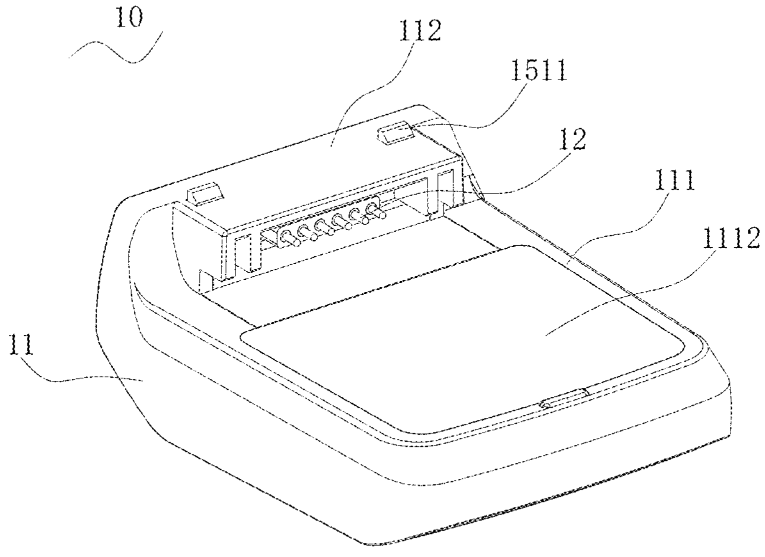
FIG. 1 is a schematic structural view of the external flash of an embodiment of the present application.

A typical embodiment demonstrating the features and advantages of the present application will be described in detail below. It should be understood that the present application is capable of various changes in different embodiments, all without departing from the scope of the present application, and the descriptions and drawings herein are essentially for illustrative purposes rather than to limit the present application.

In the description of the present application, it should be understood that in the embodiments shown in the drawings, indications of directions or positional relationships (such as up, down, left, right, front, and rear, etc.) are only for the convenience of describing the present application and simplifying the description, rather than indicating or implying that the referred device or element must have a specific orientation, be constructed, and operate in a specific orientation. When these elements are in the positions shown in the drawings, these descriptions are appropriate. If the description of the positions of these elements changes, the indications of these directions shall also change accordingly.

Furthermore, the terms "first" and "second" are only used for descriptive purposes and cannot be interpreted as indicating or implying relative importance or implicitly specifying the quantity of the indicated technical features. Thus, a feature defined with "first" or "second" may explicitly or implicitly include one or more of such features. In the description of this application, "a plurality of" means two or more, unless specifically and clearly defined otherwise.

Figure 2:
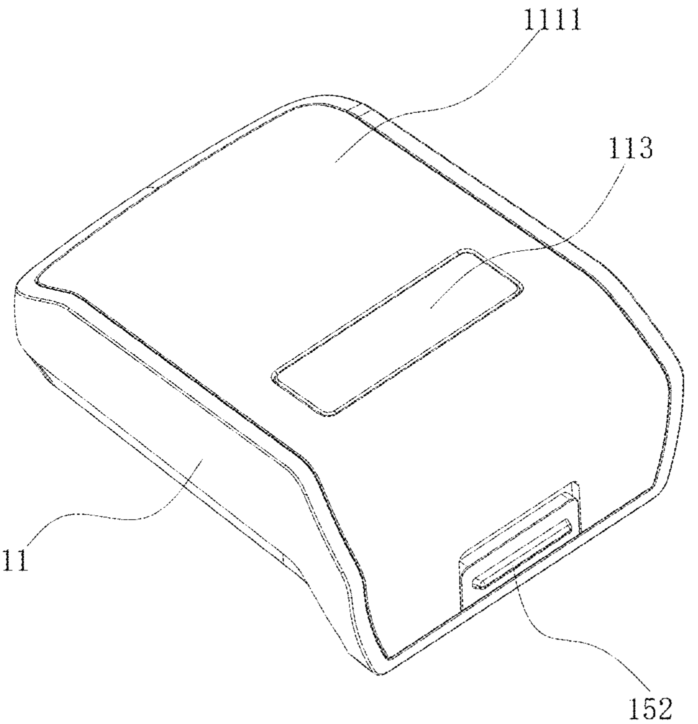
FIG. 2 is another schematic structural view of the external flash shown in FIG. 1.
Figure 3:
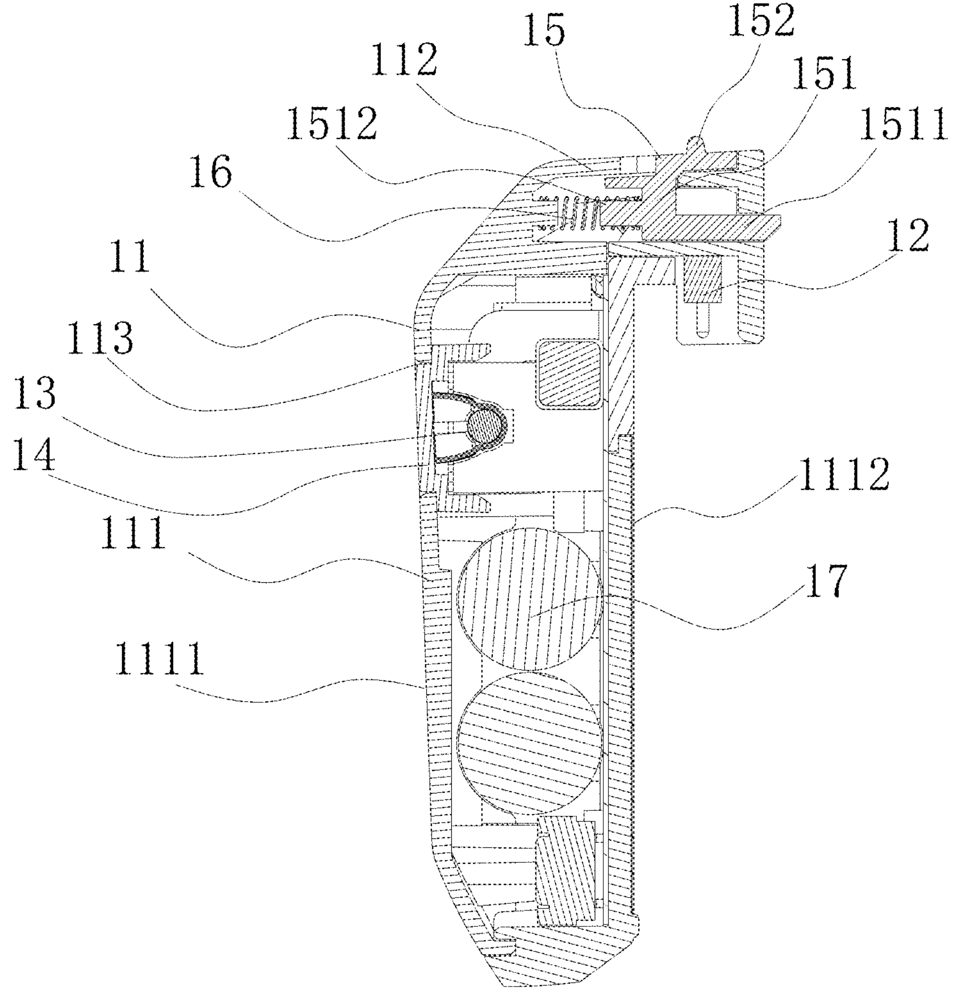
FIG. 3 is a cross-sectional view of the external flash shown in FIG. 1.
Figure 4:
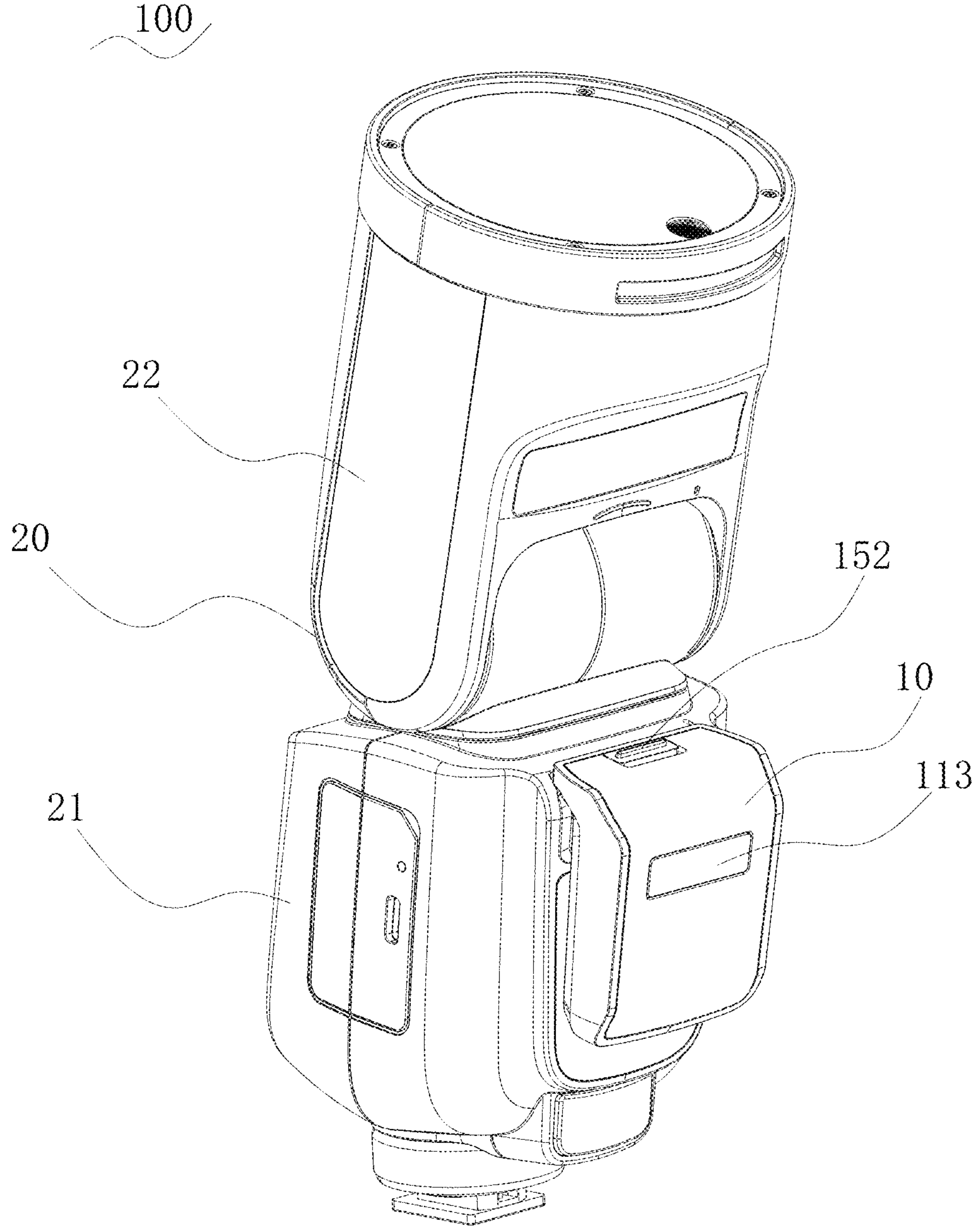
FIG. 4 is a schematic structural view of the flash system of the present application.

Referring to FIGS. 1 to 4, an embodiment of the present application provides an external flash 10. The external flash 10 can be detachably mounted on a camera-mounted flash, electrically connected to the camera-mounted flash, and has a light-emitting direction different from that of the camera-mounted flash.

The external flash 10 can be detachably connected to the camera-mounted flash 20 by means of clamping, bonding, screwing, magnetic fixation, or the like. The camera-mounted flash 20 is an external photography auxiliary lighting device mounted on a camera through a hot shoe at the top of the camera. In addition to the camera-mounted flash 20, other types of flashes such as handle flashes and studio flashes can also be used.

The camera-mounted flash 20 includes a body 21 and a lamp head 22 rotatably provided at the top of the body. The external flash 10 is provided on the front side of the body 21. The end surface of the lamp head 22 facing away from the body 21 is the light-emitting surface of the camera-mounted flash 20. The outer side of the external flash 10 is provided with a light-transmitting window 113 for light emission. The light-transmitting window 113 faces the front side of the camera-mounted flash 20, and light emitted by a light source in the external flash 10 can be emitted toward the front side of the external flash 10 through the light-transmitting window 113.

The camera-mounted flash 20 is mounted on a shooting device such as a camera or a video camera. The front side of the camera-mounted flash 20 is provided corresponding to the lens of the shooting device, that is, the light-transmitting window 113 of the external flash 10 faces the lens of the shooting device.

After the external flash 10 is fixed to the camera-mounted flash 20, the external flash 10 can be electrically connected to the camera-mounted flash 20 to realize the transmission of control signals and operating current. The external flash 10 and the camera-mounted flash 20 can be connected by the terminal, wired circuit, wireless, or the like. The lighting range of the external flash 10 can supplement the lighting range of the camera-mounted flash 20, effectively solving the problem of low brightness in some areas, greatly improving the lighting effect, and ensuring the user experience.

In this embodiment, the external flash 10 includes a housing 11, and the housing 11 includes a housing main body 111 and a housing extension 112. The housing extension 112 is provided at the top of the housing main body 111, and the inside of the housing extension 112 is in communication with the inside of the housing main body 111.

The opposite sides of the housing main body 111 are a first surface 1111 and a second surface 1112, respectively. One end of the housing extension 112 is connected to the top of the housing main body 111, another end of the housing extension 112 is provided close to the second surface 1112 of the housing main body, and the housing extension 112 protrudes from the second surface 1112 of the housing main body 111.

In this embodiment, the external flash 10 includes a first terminal, the first terminal is a probe terminal male seat 12, the probe terminal male seat 12 is fixed on the surface of the housing extension 112 close to the housing main body 111, and the extension direction of the probe terminal male seat 12 is consistent with the length direction of the housing main body 111. The probe terminal male seat 12 in the external flash 10 of this embodiment includes a plurality of probes, the plurality of probes are provided at intervals, and the end of each probes protrudes from the surface of the housing extension 112.

A first surface 1111 of the housing main body 111 in this embodiment is provided with a light-transmitting window 113, and the light-transmitting window 113 is in communication with the inside of the housing 11. In this embodiment, the external flash 10 further includes a lamp tube 13 and a Fresnel lens 14. The lamp tube 13 is provided inside the housing main body 111 and corresponding to the light-transmitting window 113. The Fresnel lens 14 is provided at the light-transmitting window 113.

Light emitted by the lamp tube 13 can pass through the Fresnel lens 14 and be emitted from the housing 11. The Fresnel lens 14 can focus light and enhance the light effect of the external flash 10. When the external flash 10 is provided on the camera-mounted flash 20, the second surface 1112 of the housing main body 111 is attached to the camera-mounted flash 20, and light emitted by the lamp tube 13 can be emitted from the light-transmitting window 113 opened on the first surface 1111.

In this embodiment, the external flash 10 further includes a movable switch 15, and the movable switch 15 includes a switch body 151 and a toggle portion 152 protruding from a top surface of the switch body 151. The movable switch 15 is movably provided on the housing 11, the switch body 151 is provided inside the housing extension 112, and the toggle portion 152 extends out of the top surface of the housing extension 112.

The toggle portion 152 is used for an operator to hold and toggle. Through the toggle portion 152, the movable switch 15 can be moved relative to the housing 11 efficiently and quickly.

The two ends of the switch body 151 in this embodiment are a connection end 1511 and a fixing end 1512, respectively, and the connection end 1511 and the fixing end 1512 are oppositely provided. In this embodiment, the external flash 10 further includes an assembly spring 16, one end of the assembly spring 16 is fixed inside the housing 11, and another end of the assembly spring 16 is fixedly connected to the fixing end 1512 of the switch body 151.

The assembly spring 16 can elastically expand and contract, so that the movable switch 15 can move relative to the housing 11. The movable switch 15 moves relative to the housing 11, so that the connection end 1511 of the movable switch 15 can extend out of the housing 11 or be received inside the housing 11. The connection end 1511 of the movable switch 15 is used for fixing with the camera-mounted flash 20.

When the external flash 10 needs to be fixed to the camera-mounted flash 20, the movable switch 15 is pushed to move through the toggle portion 152, and under the action of the elastic expansion and contraction of the assembly spring 16, the connection end 1511 can extend out of the housing 11 to be connected with the camera-mounted flash 20, so that the external flash 10 is stably fixed to the camera-mounted flash 20.

In other examples of this embodiment, the connection end 1511 can be set as a hook structure, a magnetic suction column structure, or other structural forms, and a corresponding matching structure is provided on the camera-mounted flash 20 to realize the connection and fixation between the external flash 10 and the camera-mounted flash 20.

In this embodiment, the extension direction of each probe in the probe terminal male seat 12 is perpendicular to the extension direction of the connection end 1511. The probes are in plug-in fit with the probe terminal female seat 23 of the camera-mounted flash 20 in a first direction, and the connection end 1511 is fixedly connected with the camera-mounted flash 20 in a second direction. The first direction is perpendicular to the second direction, which can realize the stable connection of the external flash 10 on the camera-mounted flash 20.

In addition, the external flash 10 further includes a capacitor 17, and the capacitor 17 is provided inside the housing main body 111. The capacitor 17 can be connected with the lamp tube 13 to provide a working voltage for the lamp tube 13 and realize the flashing effect of the external flash 10.

Figure 5:
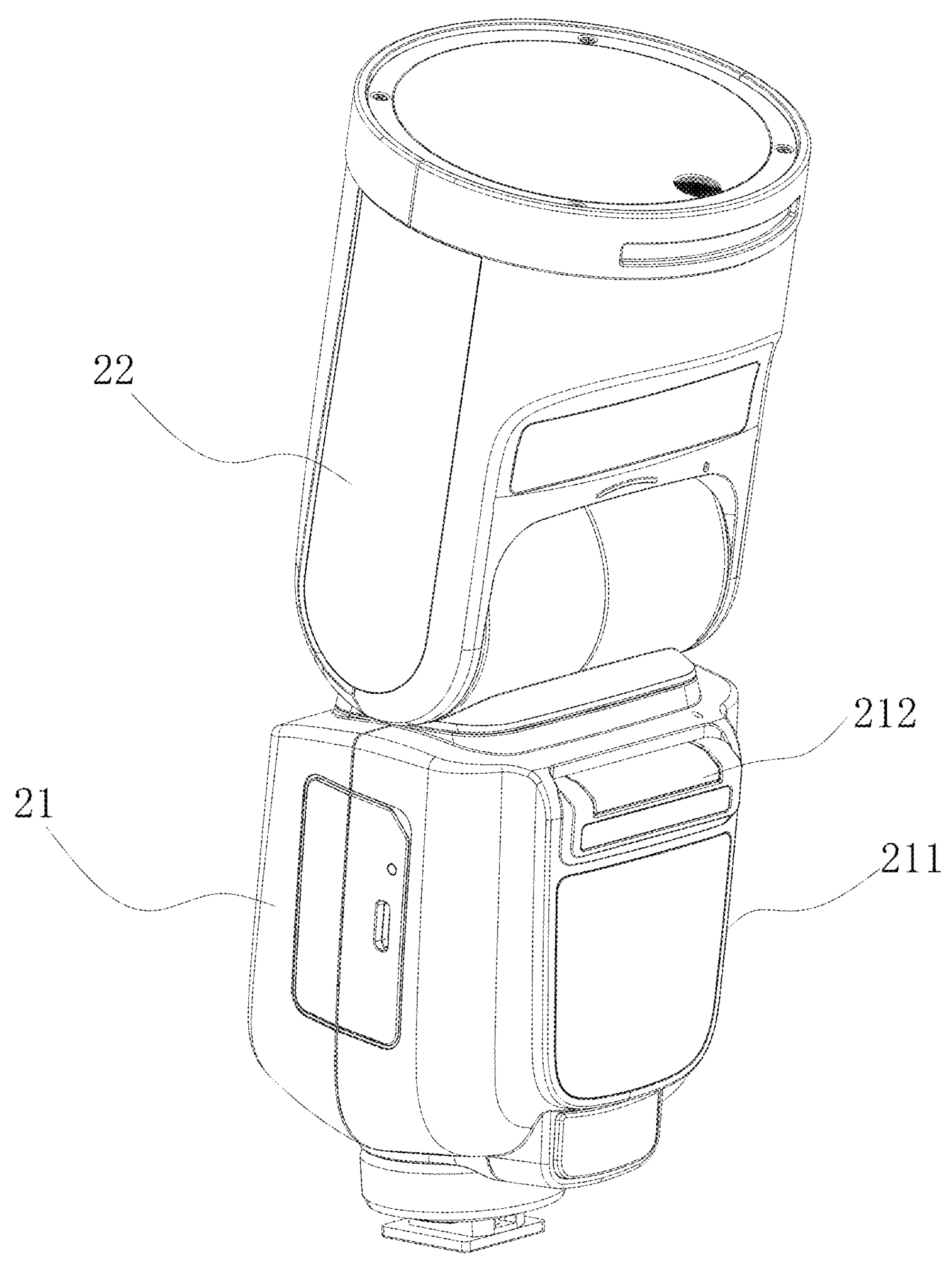
FIG. 5 is a schematic structural diagram of the camera-mounted flash in the flash system shown in FIG. 4.
Figure 6:
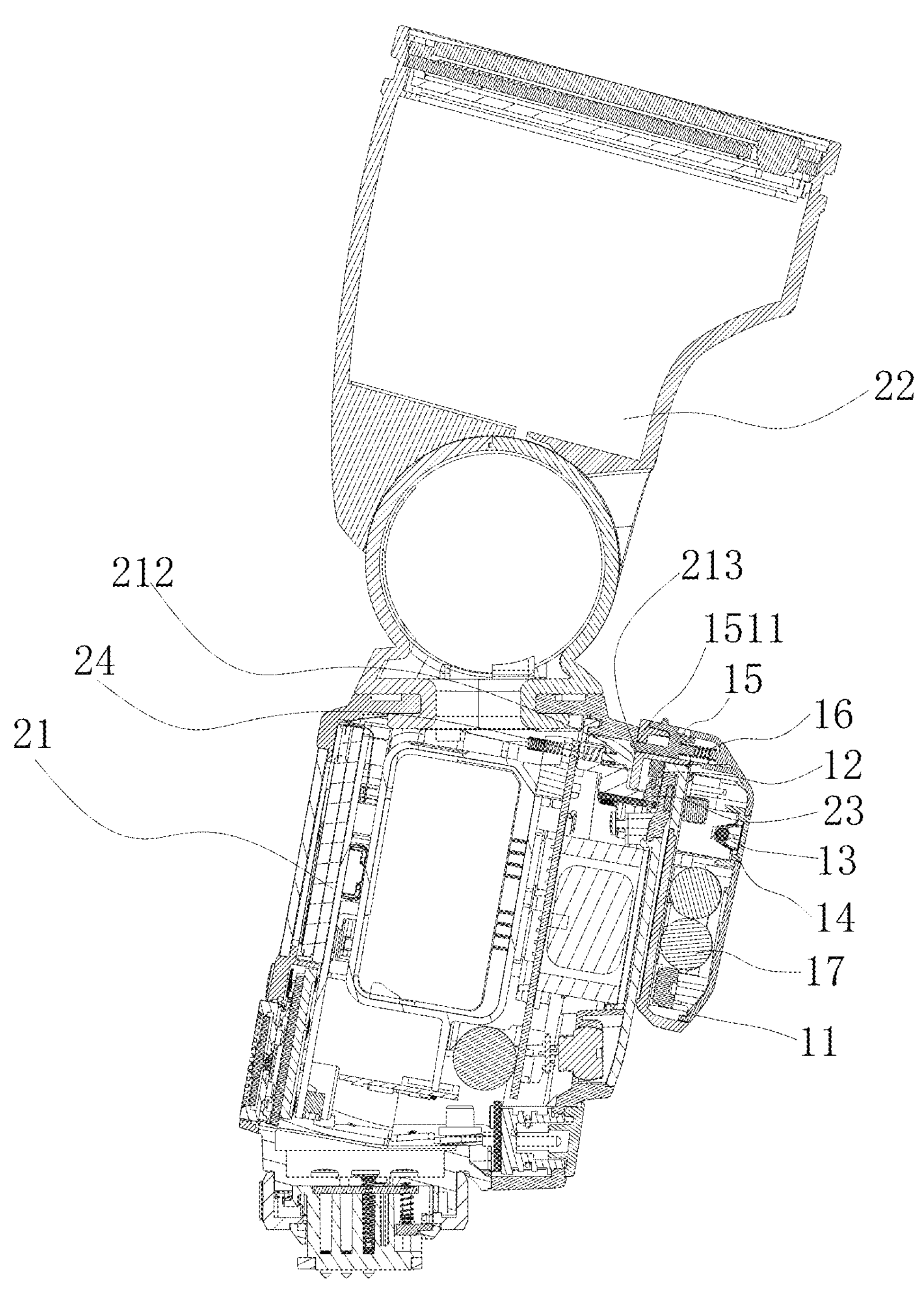
FIG. 6 is a cross-sectional view of FIG. 4.
Figure 7:
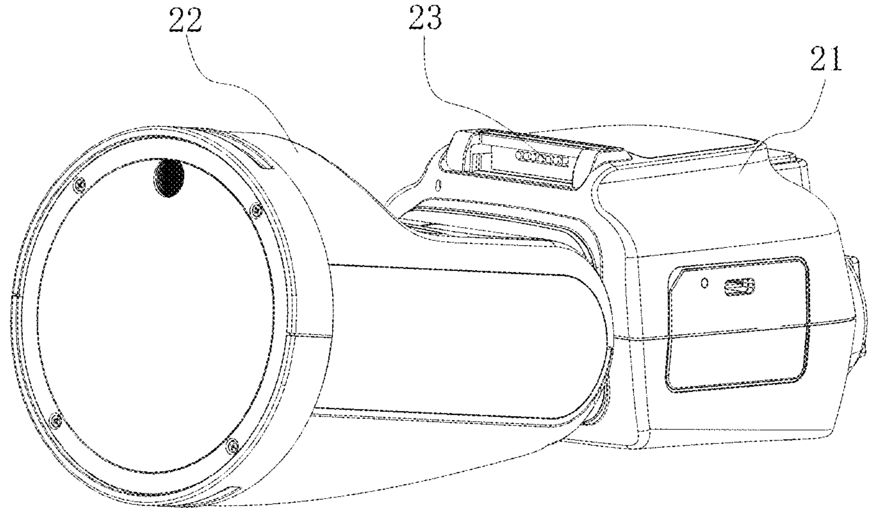
FIG. 7 is a schematic diagram of the internal structure of the flash system shown in FIG. 4.
Figure 8:
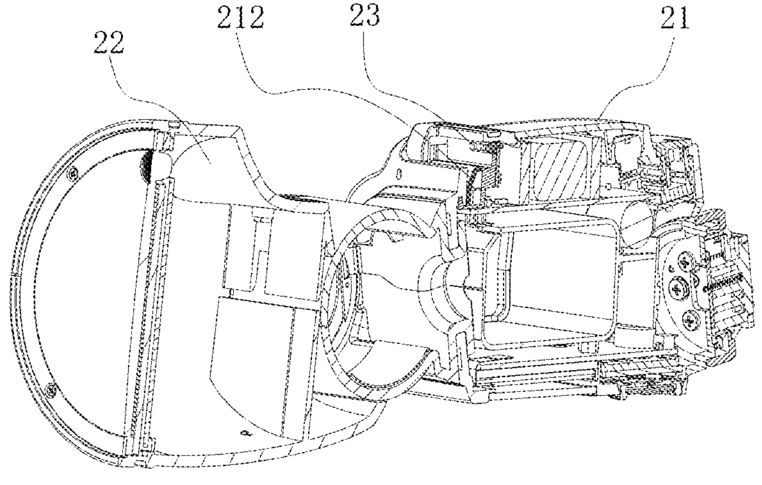
FIG. 8 is a cross-sectional view of FIG. 7.

Further, with reference to FIGS. 4 to 8, an embodiment of the present application further provides a flash system 100, which includes an external flash 10 and a camera-mounted flash 20. The main structure of the external flash 10 has been described above and will not be repeated here.

In this embodiment, the camera-mounted flash 20 includes a body 21 and a lamp head 22. The lamp head 22 is rotatably connected to the top of the body 21. The end surface of the lamp head 22 facing away from the body 21 is the light-emitting surface of the camera-mounted flash 20, and light emitted by the camera-mounted flash 20 is emitted from the light-emitting surface.

The body 21 in this embodiment includes a casing 211 and a cover plate 212, and the casing 211 is provided with an opening. The camera-mounted flash 20 further includes a second terminal, the second terminal is a probe terminal female seat 23, which is provided inside the body 21 and corresponding to the opening.

The camera-mounted flash 20 further includes a mounting spring 24, and the cover plate 212 is movably provided on the casing 211 through the mounting spring 24 to open or close the opening. When the opening is open, the probe terminal male seat 12 can extend into the body 21 through the opening to be in docking engagement with the probe terminal female seat 23.

In this embodiment, the probe terminal female seat 23 includes a plurality of terminals, and the plurality of terminals are provided at intervals. When the external flash 10 is connected to the camera-mounted flash 20, the plurality of probes of the probe terminal male seat 12 are in one-to-one plug-in fixation with the probe terminal female seat 23 to realize the electrical connection of the external flash 10 and the camera-mounted flash 20, so that the external flash 10 and the camera-mounted flash 20 can realize the transmission of control signals and operating current, thereby enabling the external flash 10 to be triggered by the function keys of the camera-mounted flash.

In other examples of this embodiment, in addition to the electrical connection mode in which the probe terminal male seat 12 is in docking engagement with the probe terminal female seat 23, the external flash 10 and the camera-mounted flash 20 can also transmit control signals through wireless signals, and a battery can be provided inside the housing 11 of the external flash 10 as a power source.

The side of the body 21 of the camera-mounted flash 20 in this embodiment is provided with a connection hole 213, and the connection end 1511 of the movable switch 15 can pass through the connection hole 213, so that the external flash 10 is fixed to the camera-mounted flash 20. The probes are in plug-in fit with the probe terminal female seat 23 of the camera-mounted flash 20 in a first direction, and the connection end 1511 is fixedly connected with the camera-mounted flash 20 in a second direction. The first direction is perpendicular to the second direction, which can realize the stable connection of the external flash 10 on the camera-mounted flash 20.

When the external flash 10 is connected to the camera-mounted flash 20, the first surface 1111 of the housing main body 111 is attached to the side of the body 21, and the light-transmitting window 113 of the external flash 10 is provided away from the body 21. The lamp head 22 of the camera-mounted flash 20 is provided at the top of the body 21, the end surface of the lamp head 22 facing away from the body 21 is the light-emitting surface of the camera-mounted flash 20, the lighting range of the external flash 10 can supplement the lighting range of the camera-mounted flash 20, effectively solving the problem of low brightness in some areas, greatly improving the lighting effect, and ensuring the user experience.

Although the present application has been described with reference to several typical embodiments, it should be understood that the terms used are illustrative and exemplary rather than restrictive. Since the present application can be embodied in many forms without departing from the spirit or substance of the application, it should be understood that the above embodiments are not limited to any of the foregoing details but should be broadly construed within the spirit and scope defined by the appending claims. Therefore, all changes and modifications falling within the scope of the claims or their equivalents should be covered by the appending claims.

What is claimed is:

1. An external flash, wherein the external flash is configured to be detachably mounted on and electrically connected to a camera-mounted flash, the camera-mounted flash comprising a body and a flash head;

wherein a rear side of the external flash is configured to be mounted onto a front side of the body of the camera-mounted flash; and a light-transmitting window configured for light emission is disposed on an outer side of the external flash, and wherein the external flash is configured such that light emitted by a light source in the external flash is emitted toward the front side of the external flash through the light-transmitting window to supplement illumination in a front area of the camera-mounted flash when the flash head of the camera-mounted flash is tilted upward.

2. The external flash according to claim 1, wherein an electrical signal between the external flash and the camera-mounted flash is a wireless signal.

3. The external flash according to claim 1, wherein the external flash is electrically connected to the camera-mounted flash through a terminal.

4. The external flash according to claim 3, further comprising a battery or a power supply module, and the power supply module is electrically connected to the terminal.

5. The external flash according to claim 1, further comprising a housing and a lamp tube provided inside the housing, the light-transmitting window is provided on the housing, and the lamp tube is provided close to the light-transmitting window.

6. The external flash according to claim 1, further comprising a Fresnel lens provided at the light-transmitting window.

7. A flash system, comprising an external flash and a camera-mounted flash, wherein the external flash is detachably mounted on and is electrically connected to the camera-mounted flash, the camera-mounted flash comprises a body and a flash head rotatably arranged at a top of the body, and an end surface of the flash head facing away from the body is a light-emitting surface of the camera-mounted flash;

wherein a rear side of the external flash is mounted on a front side of the body of the camera-mounted flash;

a light-transmitting window configured for light emission is provided disposed on an outer side of the external flash, and light emitted by a light source in the external flash is emitted toward the front side of the external flash through the light-transmitting window; and;

wherein the external flash is configured such that light emitted by a light source in the external flash is emitted toward a front side of the external flash through the light-transmitting window to supplement illumination in a front area of the camera-mounted flash when the flash head of the camera-mounted flash is tilted upward.

8. The flash system according to claim 7, wherein the external flash comprises a housing and a first terminal provided on the housing, and the camera-mounted flash comprises a second terminal provided inside the body; the first terminal is in docking engagement with the second terminal to fix the external flash on the front side of the body and electrically connect the external flash to the camera-mounted flash.

9. The flash system according to claim 8, wherein the external flash further comprises a movable switch comprising a connection end; the movable switch is movably provided in the housing, such that the connection end extends out of the housing or is received inside the housing, and the connection end is used for connecting with the camera-mounted flash.

10. The flash system according to claim 9, wherein the first terminal is a probe terminal male seat comprising a plurality of probes provided at intervals; the second terminal is a probe terminal female seat comprising a plurality of terminals provided at intervals; the plurality of probes are in plug-in engagement with the probe terminal female seat in a first direction.

11. The flash system according to claim 10, wherein an extension direction of each probe in the probe terminal male seat is perpendicular to an extension direction of the connection end, and the connection end is connected and fixed to the camera-mounted flash in a second direction, and the first direction is perpendicular to the second direction.

12. The flash system according to claim 9, wherein the body is provided with a connection hole, and the connection end of the movable switch passes through the connection hole to connect and fix the external flash to the camera-mounted flash.

13. The flash system according to claim 9, wherein the external flash further comprises an assembly spring provided inside the housing; the movable switch further comprises a fixing end opposite to the connection end; and one end of the assembly spring is fixed to an inner wall of the housing, and another end of the assembly spring is connected to the fixing end; the assembly spring elastically expands and contracts to enable the connection end to extend out of the housing or be received inside the housing.

14. The flash system according to claim 13, wherein the movable switch comprises a switch body and a toggle portion convexly provided on a top surface of the switch body, and opposite ends of the switch body are respectively the connection end and the fixing end; the switch body is provided inside the housing, and the toggle portion extends out of a top surface of the housing.

15. The flash system according to claim 8, wherein the body comprises a casing and a cover plate, the casing is provided with an opening, and the second terminal is provided inside the body and corresponding to the opening.

16. The flash system according to claim 15, wherein the camera-mounted flash further comprises a mounting spring, and the cover plate is movably provided on the casing through the mounting spring to open or close the opening; when the opening is open, the first terminal extends into the body through the opening to be in docking engagement with the second terminal.

17. The flash system according to claim 7, wherein an electrical signal between the external flash and the camera-mounted flash is a wireless signal.

18. The flash system according to claim 7, wherein the external flash is electrically connected to the camera-mounted flash through a terminal.

19. The flash system according to claim 18, wherein the external flash further includes a battery or a power supply module, and the power supply module is electrically connected to the terminal.

20. The flash system according to claim 7, wherein the external flash further includes a housing and a lamp tube provided inside the housing, the light-transmitting window is provided on the housing, and the lamp tube is provided close to the light-transmitting window.

* * * * *